_United States Patent Office_

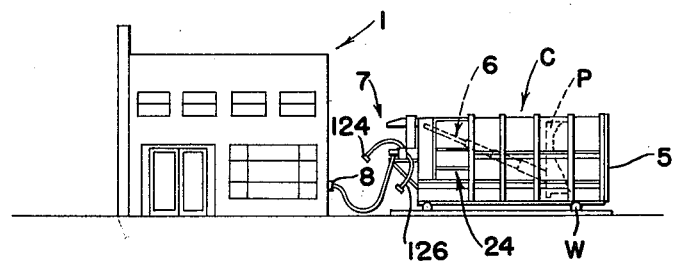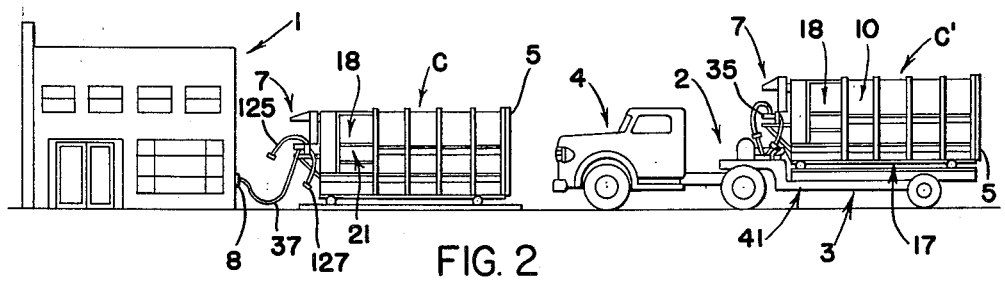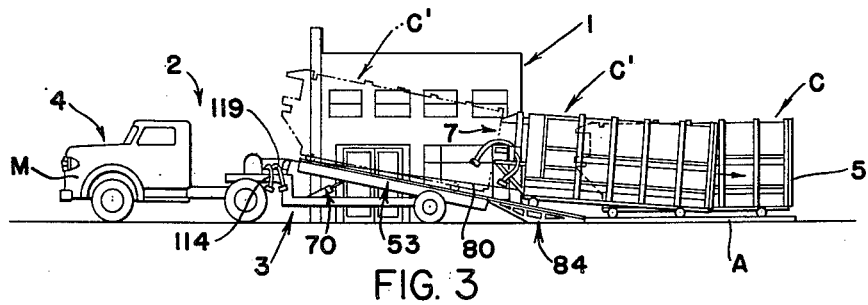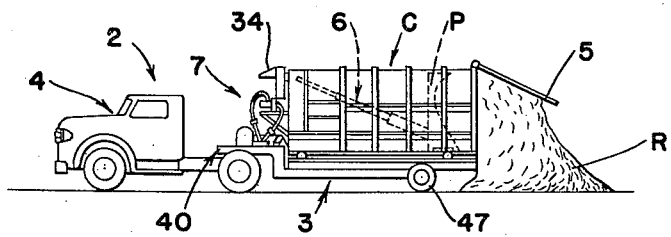

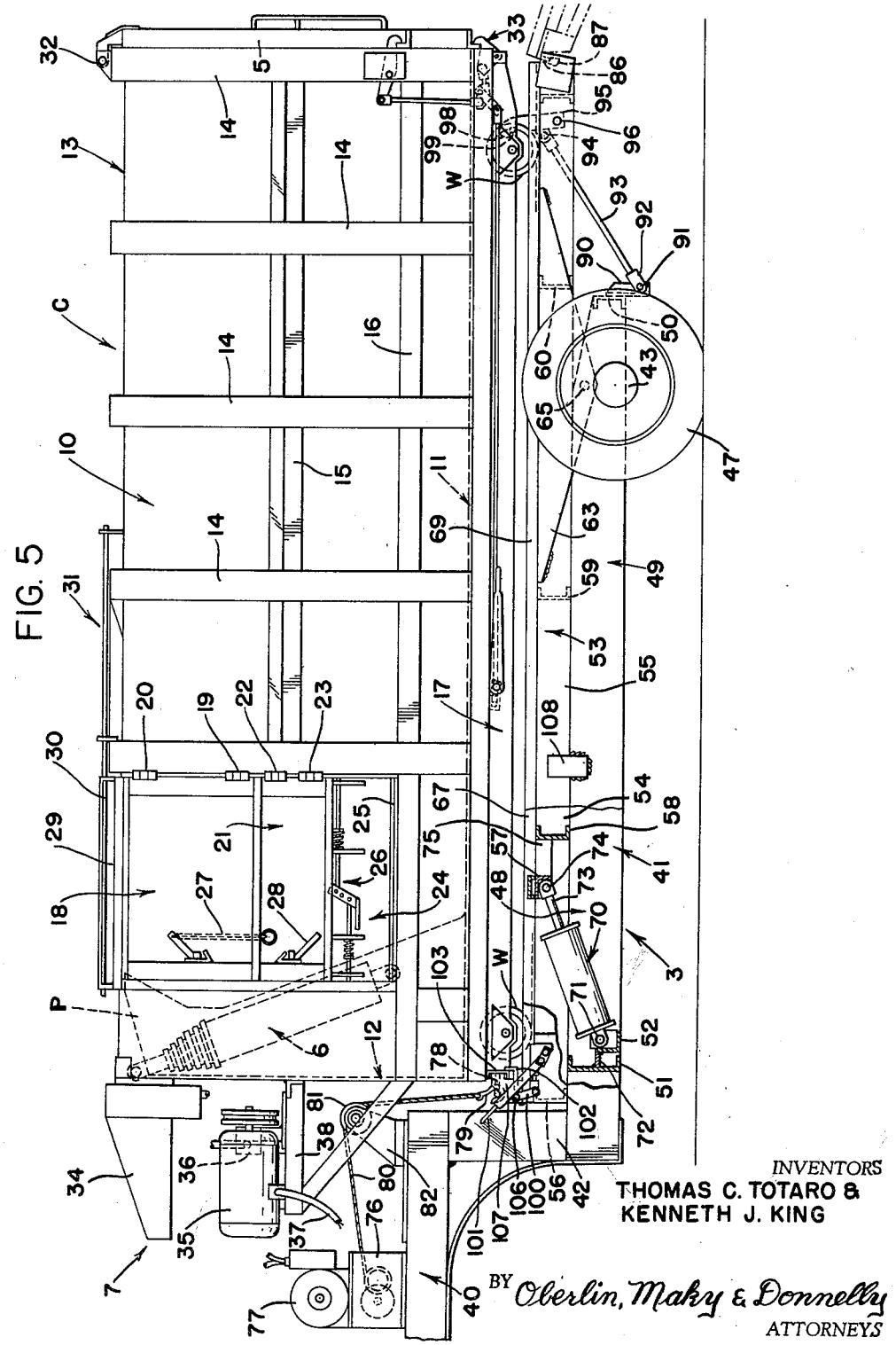

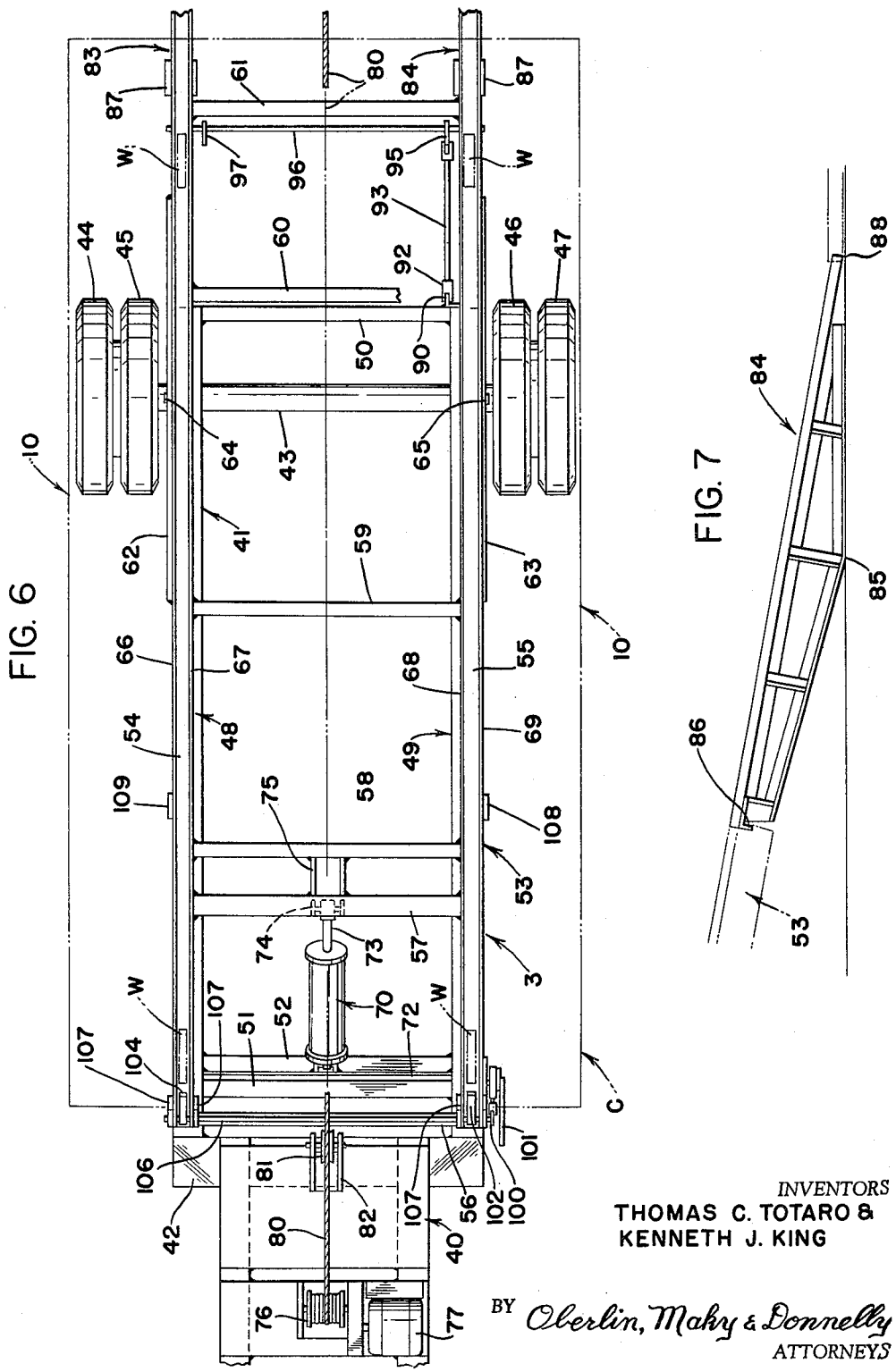

3,071,264
Patented Jan. 1, 1963

3,071,264
REFUSE COLLECTION SYSTEM
Thomas C. Totaro, Marion, and Kenneth J. King, Galion, Ohio, assignors to Hercules Galion Products, Inc., Wilmington, Del., a corporation of Delaware
Filed Nov. 3, 1959, Ser. No. 850,613
11 Claims. (Cl. 214—82)

This application relates generally, as indicated, to a refuse collection system and more particularly to a refuse collecting container incorporating therein a packing instrumentality which may be deposited and picked up from sites adjacent sources of large refuse as, for example, supermarkets and industrial plants.

Systems on this order have been employed for some time utilizing refuse containers which may be carried to and from use locations by specially built vehicles, but these units are simply receptacles unable to provide any power compression or packing of the mass of refuse. Since this collected refuse forms a rather loose mass, a large volume thereof generally weighs very little. Accordingly, these prior systems have been quite inefficient in respect of utilization of available space and vehicle loading and, of course, with regard to the frequency of the service calls.

It is accordingly a principal object of our invention to provide a refuse collection system utilizing containers equipped for compression or packing at the places of use thereof.

It is a further principal object of our invention to provide such a refuse container that may quickly and readily be deposited and picked up at the points of origin of such refuse.

It is another object of our invention to provide a unique vehicle for the transportation of such refuse container so that it may readily be deposited and picked up at the points of origin of such refuse.

It is still a further object of our invention to provide a vehicle having a separable body adapted to contain refuse and the like, with said body having power operated packer means therein which can be operated both while the body is attached to the vehicle and when separated therefrom.

Other objects and advantages of the present invention will become apparent as the following description proceeds.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 illustrates schematically our refuse container positioned adjacent a point of origin of such refuse;

FIG. 2 illustrates schematically an empty container being delivered on our vehicle to replace the filled container at the point of origin of the refuse;

FIG. 3 illustrates the empty container being exchanged for the full one;

FIG. 4 illustrates the full container being emptied from the vehicle at an incinerator, dump or the like;

FIG. 5 is an elevation of the container employed with our invention loaded on our vehicle;

FIG. 6 is a fragmentary top plan view of the vehicle employed with our invention;

FIG. 7 is an elevational view of the ramps employed to facilitate the loading and unloading of the container from our vehicle.

Figure 8:
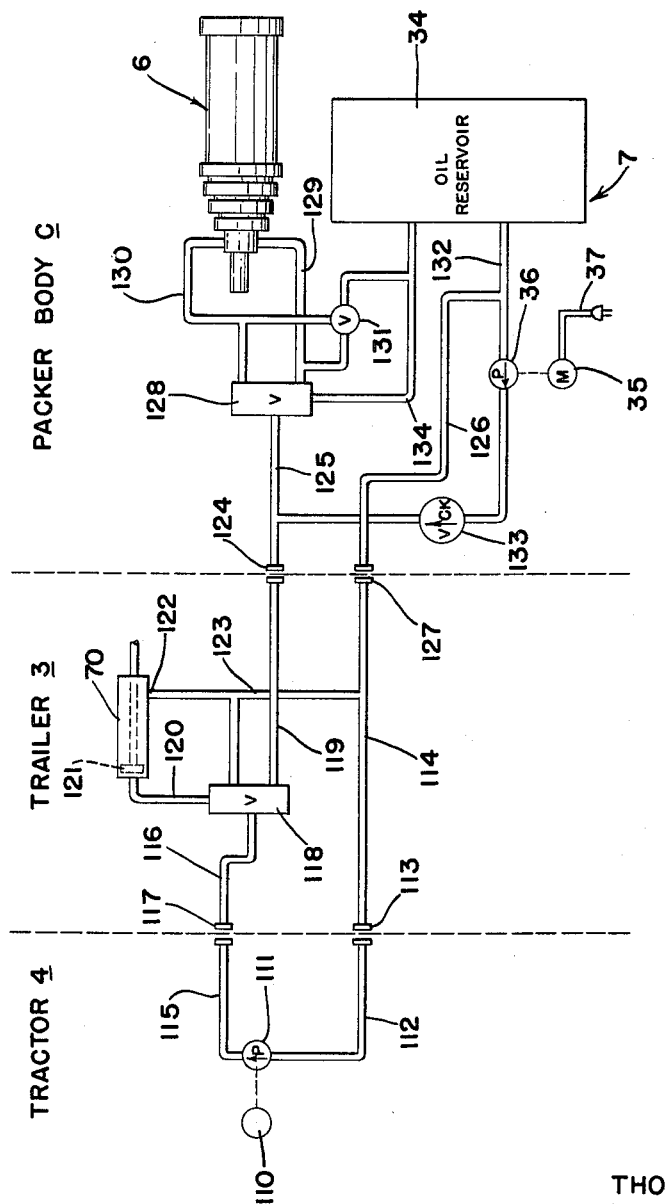
FIG. 8 is a schematic hydraulic control diagram illustrating the controls utilized to accomplish the proper performance of our invention.

Referring now to the drawings and more particularly to FIG. 1, our container body C has been positioned adjacent the point of origin of a large amount of refuse as, for example, an industrial plant or a supermarket 1.

FIG. 2 illustrates an empty container C' identical in form to the container C arriving at the plant 1 on vehicle 2, the latter comprising a trailer 3 of special construction hauled by a conventional tractor 4.

FIG. 3 shows the empty container C' being deposited at the site adjacent the full container C. The full container C is loaded on the vehicle 3 in a manner reversely to that in which the empty container C' is unloaded, as will hereinafter be described in more detail.

Referring to FIG. 4, the full container C has been transported to a dump or incinerator on the trailer 3 and is now ready to be unloaded. The container has a hinged end gate 5 and includes a telescoping cylinder 6 driven by a power unit generally shown at 7 mounted on the forward end of the container. At the unloading site, the cylinder 6 is actuated to move a platen P rearwardly within the container to force the refuse R out through the gate. As soon as the container is empty, the gate 5 is securely closed and the container C is now empty and is ready to be delivered and exchanged for a loaded container in the aforementioned identical manner that the container C' was delivered to the site 1. The driver of the tractor-trailer unit may now continue on his route and repeat the cycle just described.

Referring back to FIGS. 1 and 2, it will be seen that the power unit 7 mounted on container C may be driven or actuated by an electric motor which may be plugged in to a receptacle 8 provided at the site or point or origin of the refuse. The manner of operation of this power unit mounted on the container both while on the trailer 3 and positioned adjacent the site 1 will hereinafter more fully be discussed.

Referring now to FIG. 5, it will be seen that our container C comprises two side walls 10 and a bottom wall or floor 11. Desirably, though not necessarily, a wall 12 is added to close the front end of the container and similarily the displaceable gate 5 is employed to close the rear end thereof. The container also includes a top wall 13 extending the entire length thereof. Ordinarily, the body will be constructed of sheet metal of suitable gauge and in order to stiffen the side walls and top, vertically extending channels 14 will be employed at spaced intervals along the sides and top thereof. Additionally, horizontally extending channels 15 and 16 may also be provided further to rigidify the structure of the container. The four walls 10, 10, 11 and 13 are such as to present a smooth interior surface throughout the length of the container C.

As previously indicated, the platen P, shown in dotted lines in FIG. 5, is designed to reciprocate longitudinally within the body of the container thus provided. The platen is actuated by a piston-cylinder assembly comprising a telescoping cylinder 6 to move longitudinally within the container C in an identical manner as that disclosed in the patent to Heprich et al., 2,800,234.

The container C is mounted on a frame 17. Journalled within the frame 17 are four rather small diameter wheels W positioned at each corner of the container. It will thus be seen that the container C is itself a mobile body adapted to be mounted on the trailer 3.

In order to facilitate the placing of refuse into the container, we provide a series of doors adjacent the front end of our container. A main door 18 is provided pivoted about hinges 19 and 20 and a smaller door 21 is also provided about hinges 22 and 23. In this manner, it may be seen that either door 18 or 21 or both may be opened to provide the desired access opening. Further, to enlarge the access opening, we provide a lower drop door 24 pivoted about horizontally extending bar 25 and latched by suitable mechanism 26. The doors 18 and 21 are also provided with suitable latching mechanisms 27 and 28, respectively. Further to increase the size of the access opening, a top door 29 is pivoted about horizontally extending bar 30 located near the center of the roof or top plate 13. The door 29 may be raised and slid rearwardly along the bar 30 to the position generally shown at 31 to provide a top access opening for the placement of large amounts or pieces of refuse within our container C. We prefer to duplicate the door structures shown in FIG. 5 on the opposite side of the container thus to produce access openings readily available from either side. With the door 29 positioned rearwardly and the doors 18, 21 and 24 open, it can be seen that our container will accommodate very large pieces of refuse.

The tail gate 5 is hinged as at 32 and is provided with a double latching mechanism 33 as disclosed, for example, in the copending application of Thomas C. Totaro and John G. Sand, Serial No. 676,743, filed August 7, 1957.

Mounted on the front wall 12 of the container, we provide a power unit 7 including a fluid reservoir 34 and an electric motor 35 driving a fluid pump 36. The motor 35 is provided with a conventional electrical power cord 37 whereby the motor 35 may conveniently be connected to any suitable available source of electrical current. Most such places as supermarkets, industrial plants and the like are provided with outside electrical receptacles whereby the motor may readily be energized at the site where large amounts of refuse collect continuously. The power unit 7 also includes a control valve hereinafter more fully described. The reservoir 34 and the motor 35 may be mounted on the front side of the wall 12 through any suitable bracket means, the motor 35 being mounted on the bracket 38 illustrated.

Referring now to the trailer 3 illustrated more in detail in FIGS. 5 and 6, it will be seen that such trailer is essentially a gooseneck trailer designed to accommodate our container C thereon. The trailer 3 includes a forward platform 40 which is situated above and attached to the rear end of the tractor 4 in a conventional manner. A slightly wider and lower bed platform 41 is provided connected to the platform 40 through the gooseneck 42. The bed platform 41 mounts an axle 43 having four wheels 44, 45, 46 and 47 positioned thereon. The axle and wheel arrangement and the manner in which it is mounted on the bed platform 41 are all conventional. Noting FIGS. 1 through 4, it will be seen that the wheels 44 through 47 are of slightly smaller diameter than normal trailer wheels so that the platform 41 will be positioned as close to the ground as possible. The bed platform 41 includes two longitudinally extending channel members 48 and 49 and transverse channel members 50, 51 and 52 all connected in a suitable manner.

Pivotally mounted on the top of the bed frame 41, I provide a tilt frame 53. The tilt frame includes two longitudinally extending members or rails 54 and 55 and structural cross-members 56, 57, 58, 59, 60 and 61. The sides of the tilt frame are provided with two depending transversely aligned ears 62 and 63 which extend slightly below the top of the bed frame 41 and are pivoted thereto as at 64 and 65 respectively. Each of the longitudinally extending rails 54 and 55 includes upstanding side portions 66, 67, 68 and 69, respectively. It can now be seen that the rails 54 and 55 are channel shaped for the accommodation therein of the wheels W of the container C. In this manner, the container C may readily be accommodated on the top of the tilt frame 53, the rails 54 and 55 being of the same gauge or spacing as the wheels W.

Interconnecting the bed frame 41 and the tilt frame 53, we provide an actuating piston-cylinder assembly or motor 70, the blind end of which is pivotally connected at 71 centrally of the cross-member 52 on the bed frame 41. We further provide a supporting plate 72 interconnecting the cross-frame members 51 and 52 further to rigidify and strengthen the support for the blind end of cylinder 70. The rod 73 of the cylinder 70 is pivotally connected as at 74 to the cross-frame member 57 on the tilt frame 53. Again, we provide an interconnection 75 between the cross-frame members 57 and 58 on the tilt frame to rigidify and further support the pivotal connection 74 of the rod 73. The actuating cylinder 70 is of the raise and hold type and as can readily be seen, when actuated, it will raise the tilt frame 53 to the inclined position shown in FIG. 3.

In order readily to load and unload containers onto and off of our container supporting means, we provide the platform 40 with a winch 76 driven by a motor 77. The motor 77 may be driven either from the electrical system of the tractor 4 or from a suitable power take-off from the tractor prime mover. At the front end of the container frame 17, we provide an eye 78 for the accommodation of hook 79 attached to winch cable or rope 80. Such rope is trained over pulley 81 mounted in stanchion 82 at the rear of platform 40.

When the system operator or truck driver desires to unload a container C from the trailer 3, he will remove two ramp extensions 83 and 84 from a storage position on the sides 48 and 49 of the bed frame 41. These ramps 83 and 84 are of preferably structural aluminum welded or riveted together so that they may readily be handled manually and stored easily. Referring to FIG. 7, it will be seen that the ramp extensions are essentially an inverted king post type of construction provided with an apex 85 at the central bottom portion thereof. The ends of the extensions are provided with hooks 86 which are readily accommodated in hook receptacles 87 on the ends of the rails 54 and 55. When the ramp extensions are initially hooked to the tilt frame, the point 88 of the extension will be in contact with the ground. As soon as the tilt frame is positioned as shown in FIG. 7, the center of the frame 85 will be lowered such that the entire bottom side from the apex 85 to the point 88 may be in ground engagement. Thus, it can be seen that the extensions 83 and 84 may readily be attached to the tilt frame to extend the rails 54 and 55 to the ground. Each of the extensions 83 and 84 is provided with a channel-shaped top to constitute a continuation of the channel-shaped rails 54 and 55 readily to accommodate and guide wheels W therealong.

At each end of the tilt frame 53, we provide latching mechanisms to hold the container C securely in place when loaded on my vehicle. At the rear of the trailer bed frame 41, we weld or otherwise suitably secure a rearwardly projecting ear 90 providing pivot 91 for clevis 92. This provides a fixed pivot for link 93 pivotally connected in a similar manner at 94 to latch member 95. Latch member 95 is keyed or otherwise secured to cross-shaft 96 extending between the rails 54 and 55 of the tilt frame. On the opposite side of the frame as seen in FIG. 6, we provide a further latch member 97 substantially identical in form to the latch member 95. The cross-shaft 94 is pivotally mounted in each rail or longitudinal frame member of the tilt frame 53. The latch members 95 and 97 are provided with upper hook portions as shown at 98 in FIG. 5 and are designed to latch over a cross-shaft 99 extending transversely of the frame 17 of the container C. The latching mechanism shown at the rear of our trailer is completely automatic in operation since it will readily be understood that as the tilt frame is inclined rearwardly, the rigid link 93 will pivot the latching members in a clockwise direction as shown in FIG. 5 automatically to remove them from latching engagement with the frame 17 of the container C. This is readily discernible since the cross-shaft 96 must pivot in an arc about the pivots 64 and 65. By the time the tilt frame is in its unloading or tilted position, the latching members will be pivoted backwardly to clear the underside of the frame 17 of the container C such that it may readily pass thereover. Of course, the latch members will be pivoted in a counter-clockwise direction when the tilt frame is pivoted to a horizontal position automatically to latch the wheeled container thereon.

On the forward end of the container C, we provide a manually operated latching mechanism 100 operated by handle 101 to position hook member 102 behind the channel cross-frame member 103 of the frame 17. This manual latching mechanism holds the container C in its proper forward position on the tilt frame 53 and can readily be removed downwardly from the path of the container by actuation of handle 101. As seen in FIG. 6, we provide a further hook member 104 on the opposite side of the container actuated by cross-shaft 106 in a manner similar to the two latch members 95 and 97. The hook members 102 and 104 cooperate with members 107 on the tilt frame which fit closely within the forwardly opening channel 103 to hold the container against both longitudinal and vertical movement. Thus, it will be seen that the container C is firmly held in its four corners to the tilt frame when in loaded position. Guides 108 and 109 secured to each side of the bed panel 41 may be employed to prevent skewing of the tilt frame and further to rigidify the structure in its loaded condition.

Control System

Referring now to FIG. 8, we have illustrated the composite control system for our tractor, trailer and packer body or container C. On the tractor, we provide a power take-off 110 from the prime mover driving a fluid pump 111. The intake line 112 of such pump is provided with a quick-disconnect coupling 113 connecting it to fluid line 114 on the trailer. The outlet line 115 of the pump 111 is connected to line 116 through another suitable quick-disconnect coupling 117. The line 116 is connected to a control valve 118 to actuate the raise and hold actuating cylinder 70. The valve 118 has two operating positions in which the flow of fluid from line 116 may be directed either through line 119 or line 120. When the flow of fluid is directed through line 120, the piston 121 of cylinder 70 will move outwardly to be positioned adjacent outlet 122 leading to line 123 and back into line 114. Thus, when the valve 118 is actuated to raise the tilt frame 53, the piston 121 will move adjacent the outlet until all the fluid circulates from line 120 to 123 and will be held in this position, the fluid pressure within the cylinder counter-balancing the weight of the tilt frame in its inclined position.

The line 119 is connected through another quick-disconnect coupling 124 to a line 125 on the packer body C. The line 114 on the trailer is connected to line 126 on the container C also through a quick-disconnect coupling 127. The line 125 is connected to control valve 128 operating my telescoping cylinder construction 6 which in turn operates the platen P to pack the refuse within the body of the container C.

It can now be seen that when the valve 118 is in a postion to direct fluid from line 116 to line 119, this fluid will be directed to the valve 128 controlling the packer body platen actuating cylinder 6. When the control valve 128 is actuated to send fluid from line 124 through line 129, the cylinder 6 extends moving the platen longitudinally of the container body C to pack the refuse therein. When fluid is forced under pressure through line 129, it will be exhausted through line 130 through exhaust valve 131 back to reservoir 34. It can now be seen that with the valve 118 in the proper position and the couplings 117 and 124 connected, the power take-off 110, driving pump 111 to supply fluid under pressure to the telescoping cylinder assembly 6, will actuate the platen P when the tractor, trailer and container are in their assembled position. This condition, exemplified in FIG. 4, readily permits the platen to be extended to facilitate the unloading of the container at the incinerator, dump or the like. Thus, the power take-off will actuate both the cylinders 70 and 6 by driving the pump 111 when it is actively connected through the quick-disconnect couplings to the oil reservoir 34 on the container C.

In order to retract the cylinder 6, the valve 24 may be actuated to send fluid through line 130 and exhaust fluid through line 129.

When the container C is positioned adjacent the spot where large amounts of refuse are collected continuously, the couplings 124 and 127 will be disconnected, it being realized that such couplings close the lines when so disconnected, and the electric motor 35 will be connected to a convenient source of electrical energy by means of cord 37. When the motor 35 is energized, the pump 36 will be actuated to draw fluid from reservoir 34 through line 132 and force it through check-valve 133 into line 125 supplying control valve 128. Now the telescoping cylinders 6 may be actuated in the same manner as though the fluid pressure were supplied by the pump 111 driven by the power take-off 110. In this manner, the telescoping cylinders may readily be actuated when the motor 35 is energized and the container is sitting on the ground at the site where the refuse is being collected. The valve 133 is a ball check valve preventing fluid from flowing through pump 36 into reservoir 34 when the pump 111 is working to supply pressure to line 125. The platen will be extended in the same manner by the telescoping cylinders 6 when the pressure is supplied by pump 36 with the fluid moving through line 129 and exhausting through lines 130 and 134 to the reservoir. The valves 118 and 128 may be manually operated and placed where the operator can readily operate the same. The valve 118, for example, may be positioned in the cab of the tractor if desired. It will be realized, of course, that further hydraulic controls may be incorporated in the system as, for example, the displaceable gate 5 and the various latch mechanisms may be hydraulically controlled through such system.

Operation

Referring again to FIGS. 1 through 4, it will be seen that our refuse collection system operates substantially as follows:

A loaded unit C is positioned adjacent a point of origin 1 of refuse and the cord 37 is plugged into the receptacle 8 at such site to activate the motor 35 so that it may be controlled by a suitable switch to supply fluid to the valve 128 selectively to extend and retract the platen P within the body of the container to compact the refuse therein.

The tractor 4 arrives, either on a preset schedule or on call when the container C is full, hauling trailer 3 having an empty container C' positioned thereon. The trailer 3 is positioned to unload the empty container C' next to the container C. The driver removes the extensions 83 and 84 from their stored position on the top of the trailer frame sliding the same out and hooks them at the rear of the rails 54 and 55 to provide the pivotal extensions therefor. With the extensions properly secured, the driver will make sure that they are aligned with the platform or other suitable area A on which the container is to be positioned. Succh platform may readily be provided by the positioning of two channel-shaped rails on the ground to constitute further extensions of the pivotally mounted extensions 83 and 84. With the trailer properly aligned, the empty container is now ready to be unloaded. The operator will release latches 102 and 104 by means of the handle 101 and disconnect couplings 124 and 127. With this completed, the cylinder 70 is actuated through valve 118 to raise the tilt frame to the position shown in FIG. 3. The winch 76 is now actuated through motor 77 to pay out line 80 to allow the container C to roll down the inclined ramp now so provided to be positioned on the ground ready to receive refuse therein. As soon as the empty container C' is properly positioned beside the full container, the operator repositions the trailer and extensions, and tilts the frame again to the position shown in FIG. 3. After the cord 37 has been disconnected from the receptacle 8, the payed out line 80 is merely hooked to the eye on the front of the container and the winch is reversely driven to draw the loaded container up the ramp provided and on to the tilt platform 53. The pressure in cylinder 70 is then withdrawn and the weight of the container on the platform causes it to pivot about pivots 64 and 65 and horizontally be positioned on the bed frame 41. When the tilt frame is horizontally positioned, the link 93 automatically actuates the latches 95 and 97 to hook the cross-shaft 99 to retain the container thereon. The fluid within cylinder 70 will exhaust through valve 118 and act as a cushion slowly to lower the tilt frame on the bed of the trailer.

When the full container C is loaded on the trailer, the latches 102 and 104 will be positioned firmly to hold the container in its proper position. The latches at the front and back of the trailer together with the hook 79 are sufficient properly to maintain the container on the trailer. The quick-disconnect couplings 124 and 127 are now connected, and the trailer is now ready to transport the loaded container to the dumping site.

As shown in FIG. 4, the connection of the couplings 124 and 127 permits the power take-off 110 to actuate cylinder 7 to extend the platen to force the refuse R through the displaceable tail gate 5. As soon as the refuse has been unloaded, the operator will proceed on his route taking the now empty container to a further site to replace a filled container.

It will, of course, be understood that we may optionally interchange for the motors 35 and 77 other conventional drive means, as for example, we may employ a small gasoline powered engine in place of the motor 35 which may be preferred at locations where electric current is not readily available. Further, the motor driving the winch 76 may be driven with a hydraulic motor if desired.

Whereas we have illustrated an articulated vehicle as my container transporting means (tractor, trailer, 3, 4) it will readily be seen that other types of vehicles may be used. For example, non-articulated trucks utilizing the gooseneck body or specially designed straddle trucks may be employed.

Heretofore, such power packing units have only been available in trucks where the power for the hydraulic cylinders employed in such packing has readily been available. Container set-off systems have not been able to avail themselves of the volume of refuse that may be contained by such power packing systems. With our drive unit shown activating the telescoping cylinders, pushing the bulkhead or platen rearwardly against the waste material, a compression force of, for example, 76,600 lbs. may be obtained.

Our demountable body or container C is ideal for industrial use since it can easily be set-off and picked-up. Furthermore, the contractor need invest in only one tractor and trailer and may own a fleet of these packer bodies or containers since the power source is incorporated as a part of the container and will in addition, operate remotely from the tractor. With our system, it is possible to employ containers having much larger cubic yard capacities than more conventional containers and moreover, containers that will carry more than triple the load per cubic yard as the result of the compaction instrument it incorporates.

Other modes of applying the principles of the invention may be employed, change being made as regards the details described, provided the features stated in any of the following claims or the equivalent of such be employed.

We, therefore, particularly point out and distinctly claim as our invention:

1. In a control system for a vehicle having a demountable refuse collection body adapted to be supported entirely on said vehicle, said vehicle including a prime-mover; a self-contained power unit mounted on said body including means to actuate a platen therewithin to compact refuse, said vehicle including a power-take-off from said prime mover for actuating said platen within the body when the latter is mounted on the vehicle, and disconnectible couplings between said vehicle and body whereby the platen may be operated by the self-contained power unit carried by the body upon separation of the same from the vehicle.

2. A control system as set forth in claim 1 wherein said self-contained power unit on said body includes a fluid reservoir and a motor-driven pump operative to supply such fluid to a fluid motor to operate said platen to compact refuse within said body.

3. A system as set forth in claim 2 including a fluid pump driven by said prime mover optionally operative to supply pressure to said fluid motor for such operation of the platen.

4. A system as set forth in claim 3 including a fluid transmission line extending between said reservoir and the intake of said pump driven by said prime mover, a fluid transmission line between the outlet of said prime mover driven pump and a control valve for said fluid motor, the aforesaid disconnectible couplings being disposed in such fluid lines.

5. The method of collecting refuse comprising the steps of placing an empty container adjacent the point of origin of large amounts of such refuse, operatively connecting compacting means on such container to a source of power at such point of origin of such refuse, placing refuse within such container, compacting the refuse therein utilizing such power means, replacing such container with an empty container identical in form to the container in which the refuse has been placed, placing such container on a vehicle entirely to support the same to haul such full container, hauling such full container to a dump or the like, operatively connecting such compacting means to a source of power on such vehicle, and utilizing such compacting means to unload such container.

6. A vehicle comprising a refuse collection body, a reciprocable pressure-applying platen therein, means to reciprocate said platen, a self-contained power unit mounted on said collection body operatively connected to said means to reciprocate said platen; a frame presenting a rearwardly extending lower platform, a tilt frame pivotally mounted on said platform, anti-friction means supporting said body on said tilt frame, means for raising said tilt frame to an inclined position, whereby said body may gravitationally be removed therefrom, power means operatively connectible to said body to move the same longitudinally up said tilt frame while the latter is in such inclined condition; a prime mover to power said vehicle, said prime mover having a power take-off operatively connected to said means for raising said tilt frame and to said means for reciprocating said platen.

7. A vehicle as set forth in claim 6 including latch means for securing the body against movement on the tilt frame, and means operative automatically to release said latch means as the tilt frame is raised to its inclined position.

8. A vehicle as set forth in claim 7 wherein said means to incline said tilt frame is a fluid piston-cylinder assembly operatively connected between said vehicle and tilt frame such that said tilt frame will be raised and held in such inclined position in response to fluid pressure within said assembly.

9. A vehicle comprising a refuse collection body, a frame presenting a rearwardly extending lower platform, a tilt frame pivotally mounted on said platform, anti-friction means supporting the body on said tilt frame, and means for raising the tilt frame to an inclined position, whereby the body may gravitationally be removed therefrom, latch means for securing the body against movement on the tilt frame, and link means interconnecting said lower platform and said latch means operative automatically to release such latch means as the tilt frame is raised to its inclined position.

10. In combination, a tractor including a prime mover, a trailer, a tilt frame pivotally supported on said trailer, a packer body adapted to be supported entirely on said tilt frame, and a platen horizontally movable within said body; a control system for said combination comprising a self-contained power unit mounted on said packer body including means to actuate said platen therewithin to compact refuse, a power take-off from said prime mover for actuating said platen within said body when the latter is mounted on said tilt frame, said power take-off comprising a prime mover driven pump, disconnectible couplings connecting the inlet and outlet of said pump to fluid transmission lines on said trailer, means on said trailer connected to said fluid transmission lines to elevate said tilt frame to separate said body from said tractor-trailer, and disconnectible couplings between said transmission lines and said body whereby said platen may be operated by said power unit carried by said body upon separation of said body from said tractor-trailer.

11. The combination set forth in claim 10 wherein said self-contained power unit mounted on said packer body includes a fluid reservoir and a motor driven pump operative to supply such fluid to a fluid motor operative to move said platen to compact refuse within said body.

References Cited in the file of this patent

UNITED STATES PATENTS

| | | |
|---|---|---|
| 2,286,421 | Kahn | June 16, 1942 |
| 2,630,928 | McCombs | Mar. 10, 1953 |
| 2,789,715 | Filipoff et al. | Apr. 23, 1957 |
| 2,868,398 | Anderson et al. | Jan. 13, 1959 |
| 2,912,128 | Kamin | Nov. 10, 1959 |
| 2,934,226 | Dempster et al. | Apr. 26, 1960 |
| 3,013,675 | Schonrock | Dec. 19, 1961 |

FOREIGN PATENTS

| | | |
|---|---|---|
| 849,376 | Germany | Sept. 15, 1952 |